(12) United States Patent
Brunswig et al.

(10) Patent No.: US 9,460,415 B2
(45) Date of Patent: Oct. 4, 2016

(54) DETERMINING SEMANTIC INFORMATION OF BUSINESS APPLICATIONS

(75) Inventors: Frank Brunswig, Heidelberg (DE); Frank Jentsch, Muehlhausen (DE); Bare Said, St. Leon (DE)

(73) Assignee: SAP SE, Walldorf (DE)

( * ) Notice: Subject to any disclaimer, the term of this patent is extended or adjusted under 35 U.S.C. 154(b) by 982 days.

(21) Appl. No.: 13/293,147

(22) Filed: Nov. 10, 2011

(65) Prior Publication Data

US 2013/0125053 A1 May 16, 2013

(51) Int. Cl.
| | |
|---|---|
| *G06F 15/173* | (2006.01) |
| *G06F 17/30* | (2006.01) |
| *G06F 9/44* | (2006.01) |
| *G06Q 10/10* | (2012.01) |
| *G06F 9/54* | (2006.01) |
| *H04L 29/08* | (2006.01) |
| *H04L 29/06* | (2006.01) |

(52) U.S. Cl.
CPC ............... *G06Q 10/10* (2013.01); *G06F 9/541* (2013.01); *H04L 29/06* (2013.01); *H04L 67/10* (2013.01)

(58) Field of Classification Search
CPC ........ H04L 67/10; H04L 29/06; G06F 9/541
USPC ............................ 715/810, 764; 707/999.001
See application file for complete search history.

(56) References Cited

U.S. PATENT DOCUMENTS

| | | | | |
|---|---|---|---|---|
| 2004/0002944 | A1* | 1/2004 | Hauser et al. | 707/1 |
| 2004/0176967 | A1* | 9/2004 | Whittenberger | 705/1 |
| 2007/0239709 | A1* | 10/2007 | Wiryawan et al. | 707/6 |
| 2011/0302217 | A1* | 12/2011 | Heidasch | 707/802 |
| 2012/0131543 | A1* | 5/2012 | Sundararajan et al. | 717/104 |
| 2012/0184362 | A1* | 7/2012 | Barclay et al. | 463/25 |

OTHER PUBLICATIONS

Leymann et al., Workflow-based applications, 1997, IBM Systems Journal, ieeexplore.ieee.org.*
O'reilly, What is Web 2.0: Design patterns and business models for the next generation of software, 2007, Communications and Strategies, papers.ssrn.com.*

* cited by examiner

*Primary Examiner* — Jordany Nunez

(57) ABSTRACT

Various embodiments of systems and methods to determine semantic information of a plurality of business applications are described herein. In one aspect, a selection of user interface elements of a first business application and a second business application of the plurality of business applications are received. Further, data processing paths to a business object field and a corresponding database table field associated with the user interface elements are identified. Furthermore, semantic information of the plurality of business applications is determined by grouping the identified data processing paths, which can be used for applications such as business application integration, business data migration and the like.

19 Claims, 7 Drawing Sheets

DETERMINING SEMANTIC INFORMATION OF BUSINESS APPLICATIONS

FIELD

Embodiments generally relate to computer systems and more particularly to methods and systems to determine semantic information of a plurality of business applications.

BACKGROUND

Enterprises often use different business applications built over time in different languages using different technologies. Also, the business applications run on different hardware platforms with inconsistent user interfaces. Typically, business data of a business application is stored in a database and a user interface is provided for a user to read, create and modify the business data. In addition, there is an increasing need for business-to-business integration (e.g., integration of different business applications) running on different business systems to easily modify and automate business processes to meet new needs (e.g., networked business applications).

Further, knowing binding information (e.g., a data processing path from a user interface element to a corresponding business object field and a database table field) is vital for integrating different business applications and also for other purposes such as data migration from one business application to another and the like. In other words, such purposes (e.g., business application integration, business data migration and the like) require a significant understanding of the capabilities, the terminology and also the database schemes of the business applications. Within the business application, the data processing path from the user interface element to the corresponding business object field and the database table field is either described by mapping techniques such as object relational mapping (using meta-data) or it is hidden behind programmed application logic (using coding), which are time consuming and expensive processes. Providing a simplified method to determine and document the data processing paths associated with the user interface elements of the business applications to simplify the process of integrating the business applications, business data migrations and the like may be desirable.

SUMMARY

Various embodiments of systems and methods to determine semantic information of a plurality of business applications are described herein. In one aspect, a selection of user interface elements of a first business application and a second business application of the plurality of business applications are received. Further, data processing paths to a business object field and a corresponding database table field associated with the user interface elements are identified. Furthermore, semantic information of the plurality of business applications is determined by grouping the identified data processing paths, which can be used for applications such as business application integration, business data migration and the like.

These and other benefits and features of embodiments of the invention will be apparent upon consideration of the following detailed description of preferred embodiments thereof, presented in connection with the following drawings.

BRIEF DESCRIPTION OF THE DRAWINGS

The claims set forth the embodiments of the invention with particularity. The invention is illustrated by way of example and not by way of limitation in the figures of the accompanying drawings in which like references indicate similar elements. The embodiments of the invention, together with its advantages, may be best understood from the following detailed description taken in conjunction with the accompanying drawings.

DETAILED DESCRIPTION

Figure 1:
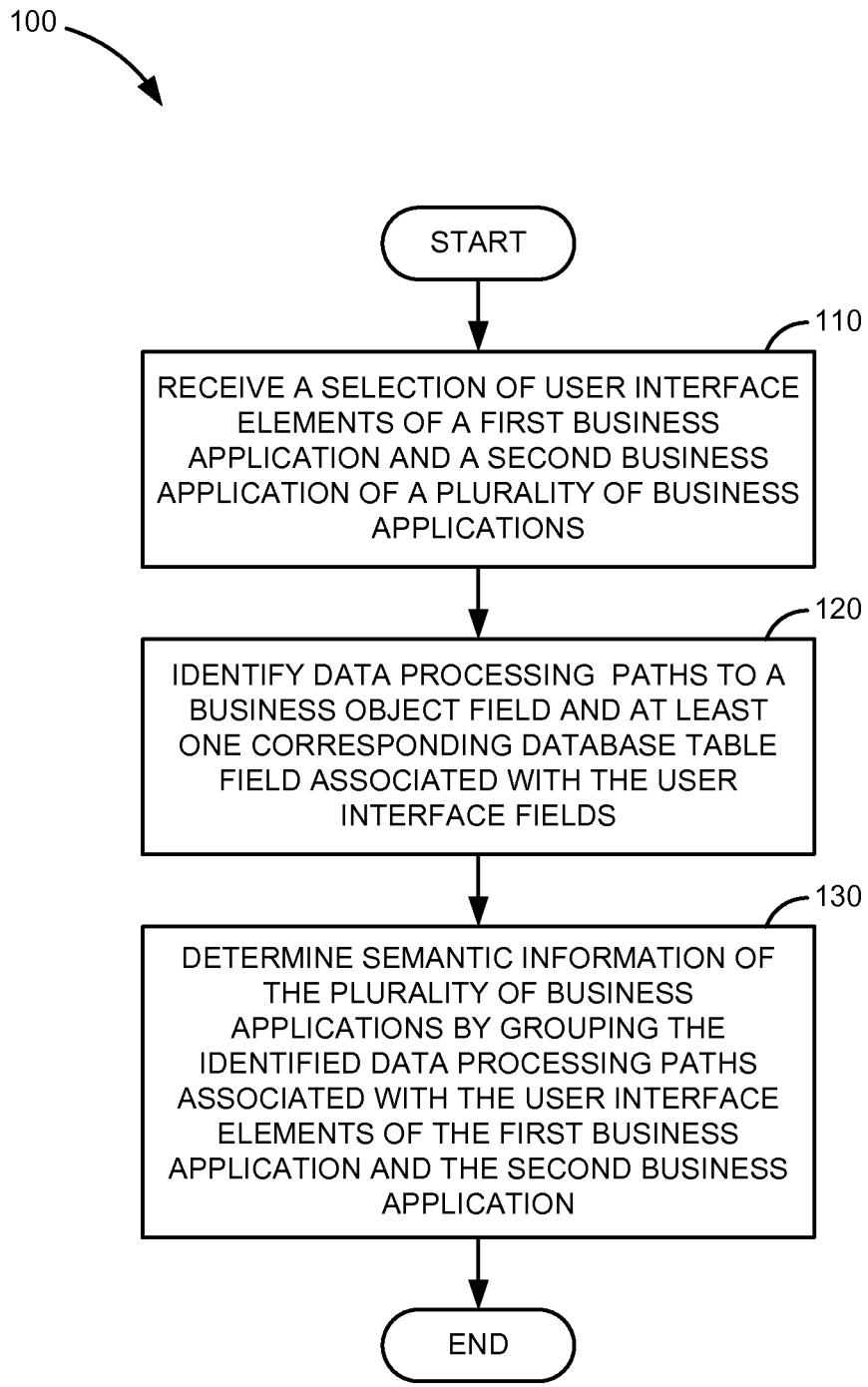
FIG. 1 is a flow diagram illustrating a method to determine semantic information of a plurality of business applications, according to an embodiment.

Embodiments of techniques to determine semantic information of business applications are described herein. A business application may include one or more business processes that help a business to increase productivity or measure the productivity. The business process may comprise a list of sequential and parallel business process steps that are executed on top of one or more business objects (i.e., business application servers) in a computer system. The computer system can support multiple business applications. In other words, one or more business applications can run on the same computer system. The computer system may be desktop computers, work stations, laptop computers, hand held computers, smart phone, console devices or the like.

According to one embodiment, user interfaces of the business applications are analyzed to identify the underlying business object fields and corresponding database table fields. Further, the semantic information of the business applications is determined by grouping the identified information of analogous of user interface elements of the user interfaces. In other words, the semantic information of the business applications is determined by analyzing the corresponding user interfaces of the business applications to find the data processing path down to the underlying business objects and to the database schemas. This semantic information documentation can then be used for the knowledge transfer in process integration, business data migration scenarios, technical business data type documentation and the like.

In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment", "this embodiment" and similar phrases, means that a particular feature, structure, or characteristic described in connection with the embodiment is included in at least one embodiment of the present invention. Thus, the appearances of these phrases in various places throughout this specification are not necessarily all referring to the same embodiment. Furthermore, the particular features, structures, or characteristics may be combined in any suitable manner in one or more embodiments.

Determining semantic information of business applications makes the process of business application integration, business data migration from one business application to another and the like easier. According to one embodiment, the user interfaces of the business applications are analyzed to determine the semantic information of the business applications. Since the user interfaces are user friendly, the user can easily identify analogous user interface elements of the user interfaces. With respect to the user interface elements identified as analogous by the user, data processing paths of the user interface elements are identified. Further, the semantic information of the business applications is determined using the data processing paths. Determining the semantic information is described in greater detail in FIG. 1.

FIG. 1 is a flow diagram 100 illustrating a method to determine semantic information of a plurality of business applications, according to an embodiment. At step 110, a selection of user interface elements of a first business application and a second business application of the plurality of business applications are received. The plurality of business applications can be from same vendor (e.g., from different version or from different products) and/or different vendors. In one embodiment, the user interface element of the second business application is indicated by a user as being analogous to the user interface element of the first business application. In other words, a user is provided an option to select the user interface element from a user interface of the first business application. Further, the user is prompted to select a user interface element of the second business application analogous to the user interface element of the first business application. For example, the user interface element 'contact number' in a user interface of the first business application can be selected by the user. Further, upon receiving prompt, the user may select the user interface element 'phone number' in a user interface of the second business application which is analogous to the user interface element 'contact number'. The user interface elements being analogous are described in greater detail in FIG. 2.

In one exemplary embodiment, the user may be required to select a predetermined key combination to start the process of determining the semantic information of the plurality of the business applications. For example, 'Shift+ Ctrl' can be set as the predetermined key combination to start the process of determining the semantic information of the business applications.

At step 120, data processing paths to a business object field and at least one corresponding database table field associated with the user interface elements of the first business application and the second business application are identified. In one embodiment, the data processing path defines binding information between the user interface element, corresponding business object field and database table field. For example, a business object field 'personal information business object' and a corresponding database table field 'personal information database' associated with the user interface element 'contact number' is identified. Further, the data processing path to the business object field and the corresponding database table field associated with the user interface element 'phone number' is identified. In one embodiment, the data processing path associated with the user interface element of the first business application is identified by a user interface field analyzer and a field mapping analyzer specific to the first business application. The data processing path associated with the user interface element of the second business application is identified by a user interface field analyzer and a field mapping analyzer specific to the second business application. Identification of the data processing path is described in greater detail in FIGS. 4 and 5.

At step 130, semantic information of the plurality of business applications is determined by grouping the identified data processing paths associated with the user interface elements of the first business application and second business application. For example, the data processing path associated with the user interface element 'contact number' and the data processing path associated with the user interface element 'phone number' are grouped and stored in a user interface analyzer unit. In one exemplary embodiment, the user interface analyzer unit stores the semantic information in a file format (e.g., stored in a form of excel, xml and the like).

Figure 2:
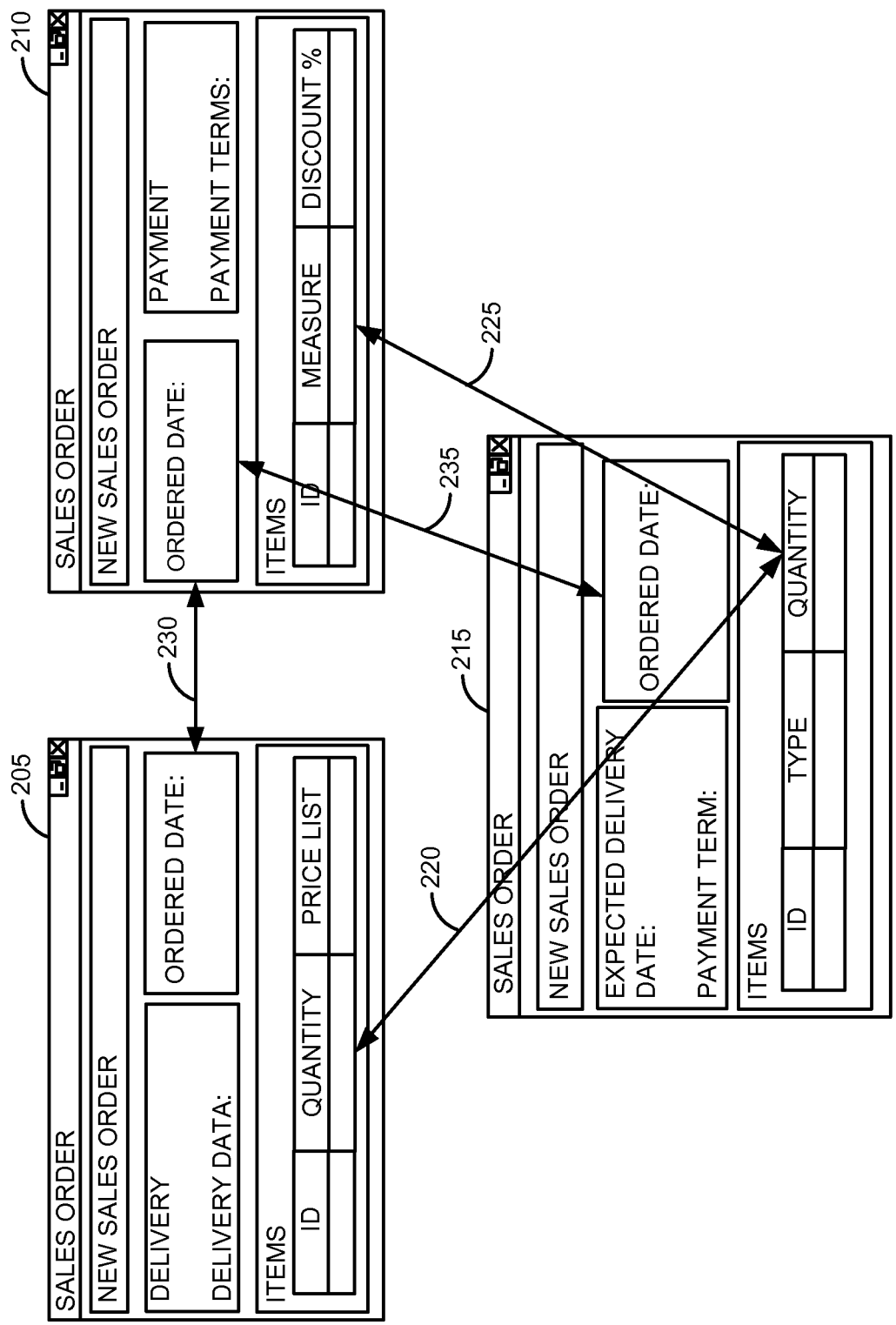
FIG. 2 shows exemplary user interfaces from same and/or different vendors, according to an embodiment.

FIG. 2 shows exemplary user interfaces from same and/or different vendors, according to an embodiment. User interfaces (e.g., 205, 210 and 215) are associated with a 'sales order' business application. In one exemplary embodiment, the user interfaces (e.g., 205, 210 and 215) may be from same and/or different vendors. The user interfaces (e.g., 205, 210 and 215) may be from same vendor having different release version or from different business application products. On the other hand, the user interfaces (e.g., 205, 210 and 215) may be from different vendors.

The user interfaces (e.g., 205, 210 and 215) may include one or more user interface elements which are analogous. The analogous user interface elements may resemble one another in function but are traceable back to different origins (e.g., business object field and database table field). For example, a user interface element 'quantity' exists in the three user interfaces (e.g., 'quantity' in 105, 'measure' in 110 and 'quantity' 115) as shown in 220 and 225, which are analogous. Similarly, the user interface element 'ordered date' exists in the three user interfaces (e.g., 205, 210 and 215), which are analogous. In one exemplary embodiment, the analogous user interface elements (e.g., 'quantity' and 'ordered date') are identified. Further, data processing paths associated with the user interface elements (e.g., 'quantity' and 'ordered date') are stored. Further, the identified data processing paths are stored as semantic information of the business applications (e.g., 'delivery order, 'sales order' and 'purchase order') and later can be used for different applications such as business application integration, data migration and the like. Determining the semantic information is explained in greater detail in FIG. 3.

Figure 3:
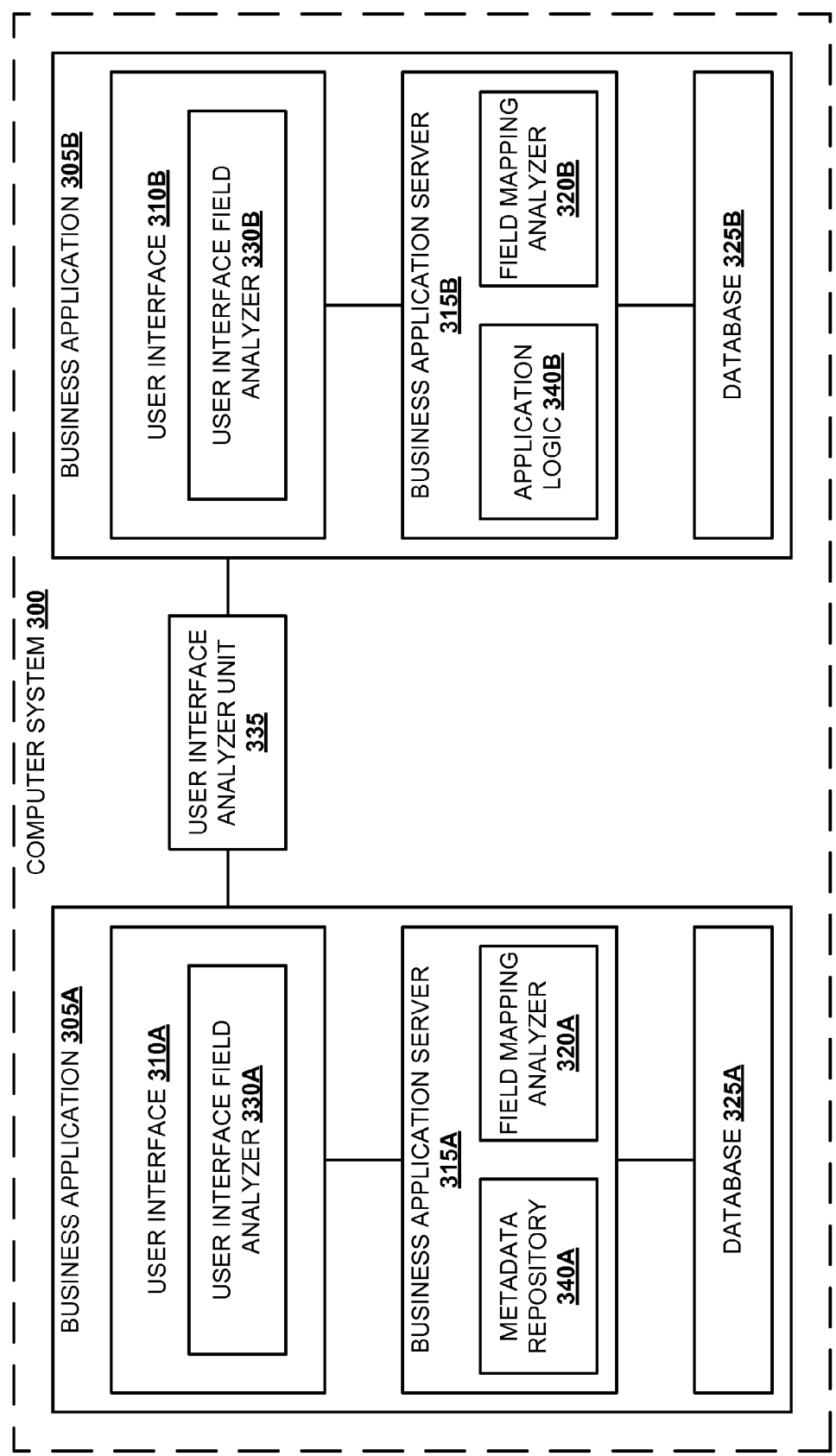
FIG. 3 is a functional block diagram illustrating a computer system to determine semantic information of a plurality of business applications, according to an embodiment.

FIG. 3 is a functional block diagram illustrating a computer system 300 to determine semantic information of a plurality of business applications, according to an embodiment. The computer system 300 supports execution of the plurality of business applications (e.g., the business applications from same and/or different vendors can be executed on the computer system 300). For example, the computer system 300 supports two business applications (e.g., 305A and 305B). Further, the business applications (e.g., 305A and 305B) can include respective computer generated user interfaces (e.g., a user interface 310A of the business application 305A and a user interface 310B of the business application 305B). The user interfaces (e.g., 310A and 310B) provide an interface for a user to interact with the computer system 300. The behavior of the user interfaces (e.g., 310A and 310B) may be governed by computer executable instructions that are executed when the user interacts with the user interfaces (e.g., 310A and 310B). The user refers to an agent, a human or other mechanism capable of providing input to a computer system.

Furthermore, the business applications (e.g., 305A and 305B) include respective business application servers (e.g., 315A and 315B) to execute respective business applications. For example, the business application server 315A is based on a metadata repository 340A (e.g., data is stored using meta-data) and the business application server 315B is based on application logic 340B (e.g., data is stored using coding). Also, the business application servers (e.g., 315A and 315B) include respective underlying databases (e.g., a database 325A associated with the business application server 315A and a database 325B associated with the business application server 315B). The databases (e.g., 325A and 325B) include an organized collection of business data used to execute the business applications (e.g., 305A and 305B).

In one embodiment, the semantic information of the business applications (e.g., 305A and 305B) is determined by analyzing user interface elements of the user interfaces (e.g., 310A and 310B). The semantic information can include data processing paths associated with analogous user interface elements of the business applications (e.g., 305A and 305B). Further, the user interface elements are analyzed using business application specific user interface field analyzers (e.g., a user interface field analyzer 330A of the business application 305A and a user interface field analyzer 330B of the business application 305B) and field mapping analyzers (e.g., a field mapping analyzer 320A of the business application 305A and a field mapping analyzer 320B of the business application 305B). Furthermore, the semantic information of the business applications (e.g., 305A and 305B) is stored in a user interface analyzer unit 335, wherein the user interface analyzer unit 335 is communicatively coupled to the business applications (e.g., 305A and 305B).

In operation, a selection of the user interface element of the business application 305A is received by the user interface field analyzer 330A. Further, the user interface field analyzer 330A triggers the field mapping analyzer 320A to identify an underlying business object field stored in the business application server 315A and one or more database table fields stored in the database 325A. The identified business object field and the database table fields constitute binding information of the user interface element, the business object field and the database table fields. In other words, the identified business object field and the database table fields corresponding to the user interface element results in a data processing path to the business object field and the database table fields associated with the user interface element.

Further in operation, a user is prompted to select a user interface element of the business application 305B corresponding to the user interface element of the business application 305A. A data processing path corresponding to the user interface element, a business object field and one or more database table fields is identified using the user interface field analyzer 330B and the field mapping analyzer 320B associated with the business application 305B. In one embodiment, the field mapping analyzers (e.g., 320A and 320B) identifies the data processing paths in different types of business application servers (e.g., the business application server 315A is based on metadata repository 340A and the business application server 315B is based on application logic 340B). The method of identifying the data processing path is described in greater detail in FIGS. 4, 5 and 6.

Furthermore in operation, the data processing path associated with the user interface element of the business application 305A and the data processing path associated with the user interface element of the business application 305B are grouped in the user interface analyzer unit 335 as the semantic information of the business applications (e.g., 305A and 305B).

Figure 4:
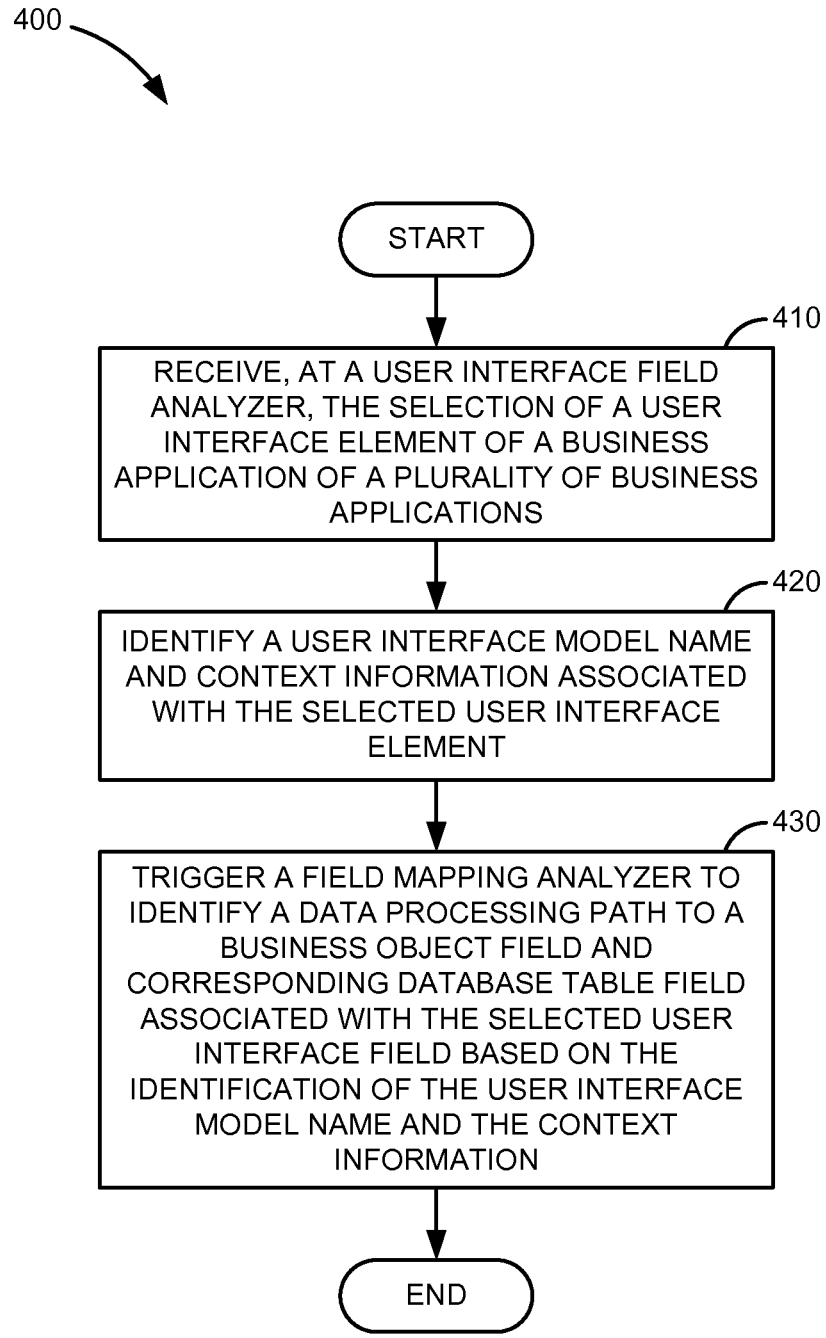
FIG. 4 is a flow diagram illustrating a method to identify a data processing path associated with a user interface element of a business application, according to an embodiment.

FIG. 4 is a flow diagram 400 illustrating a method to identify a data processing path associated with a user interface element of a business application, according to an embodiment. At step 410, a selection of the user interface element of the business application is received at a user interface field analyzer. In one embodiment, the user interface field analyzer is specific to the business application. For example, selection of a user interface element 'quantity' is received at the user interface field analyzer.

At step 420, user interface model name and context information associated with the selected user interface element are identified. For example, the user interface model name 'new sales order' and the corresponding information documenting relationships of the content information of the 'new sales order' such as screen name or table control name is identified by the user interface field analyzer.

At step 430, the user interface field analyzer triggers a field mapping analyzer to identity the data processing path to a business object field using the identified user interface model name and the context information. After identifying the business object field, the field mapping analyzer analyzes the business object to identify a corresponding at least one database table field. In one embodiment, the field mapping analyzer is specific to the business application. For example, the data processing path to a 'sales order business object' and corresponding 'sales order database scheme' associated with the user interface element 'quantity' is identified. The method of identifying the data processing path is described with an example in FIG. 5.

Figure 5:
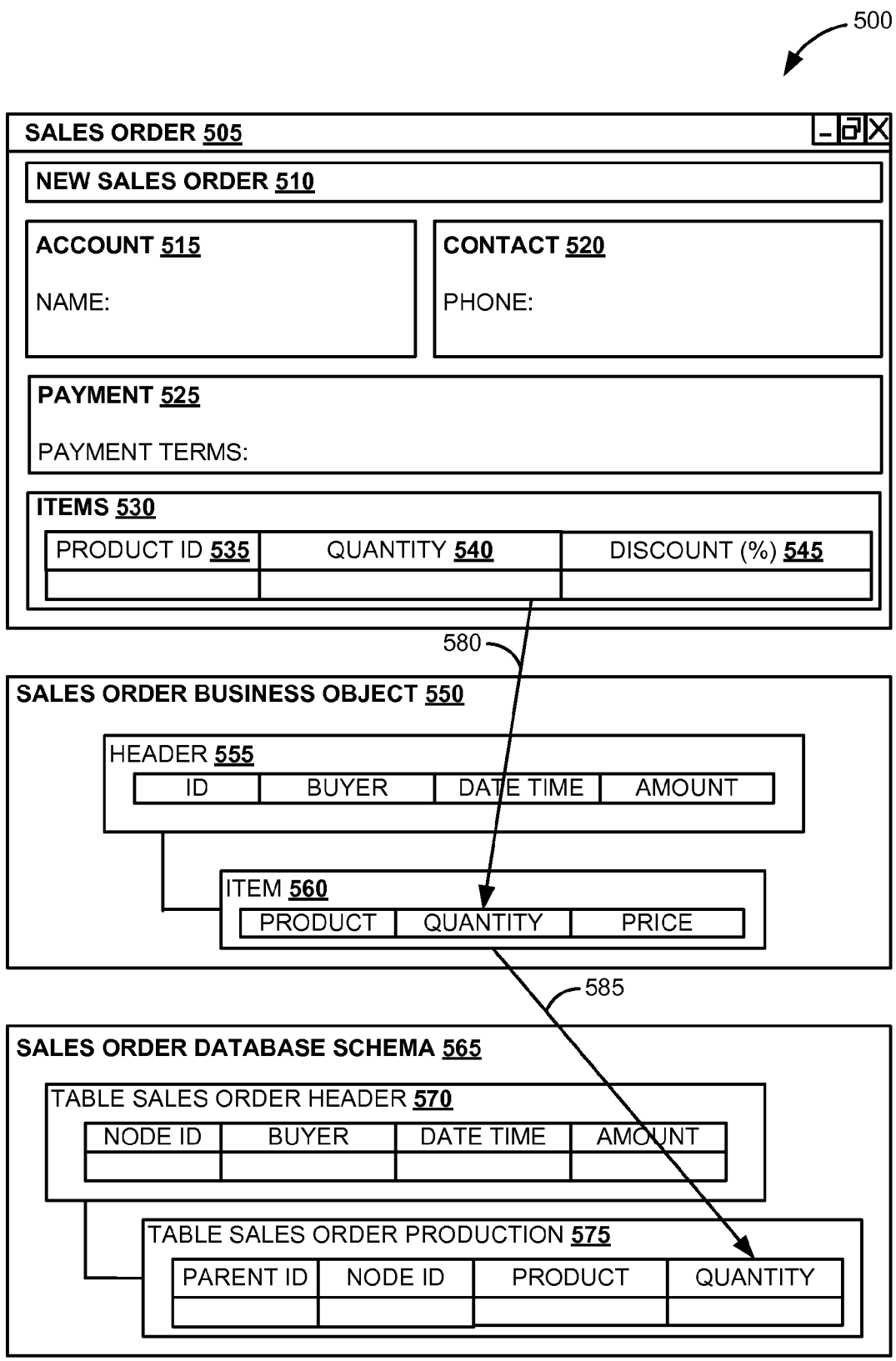
FIG. 5 is a block diagram illustrating identification of a data processing path associated with a user interface element, according to an embodiment.

FIG. 5 is a block diagram 500 illustrating identification of a data processing path associated with a user interface element, according to an embodiment. The block diagram 500 represents a business application to create a sales order. A user interface 'sales order' 505 provides an option for a user to create a new sales order 510. The sales order 510 may include one or more user interface elements such as account details (e.g., account 515), contact details (e.g., contact 520), payment details (e.g., payment 525) and items details (e.g., items 530). Further, the items details (e.g., items 530) may include one or more elements such as 'product ID' 535, 'quantity' 540, 'discount (percent)' 545, and the like. Further, the business application 'sales order' 505 can be executed using a sales order business object 550 and corresponding underlying sales order database scheme 565. The sales order business object 550 includes a 'header' 555 and 'item' 560. The 'header' 555 includes 'ID', 'buyer', 'date/time' and 'amount' associated with the sales order 510. The 'item' 560 includes 'product', 'quantity' and 'price'. Further, the underlying sales order database scheme 565 includes a 'table sales order header' 570 and a corresponding 'table sales order production' 575.

In one exemplary embodiment, when a user interface element 'quantity' is selected by a user, the data processing path to a corresponding business object field and database table fields are identified by a user interface field analyzer and a field mapping analyzer. At step 580, the user interface field analyzer receives the selected user interface element 'quantity'. Further, the user interface field analyzer identifies user interface model name and context information (e.g., sales order). In one embodiment, the user interface field analyzer triggers the field mapping analyzer to identify a corresponding business object field. Thereby, 'quantity' of the 'sales order business object' associated with the user interface element 'quantity' is identified. At step 585, a corresponding database table field is identified by the field mapping analyzer. Thereby, 'quantity' of the 'sales order database scheme' is identified. In one embodiment, the data processing path (i.e., user interface element-business object field-database table field (i.e., as mentioned in steps 580 and 585)) is stored in a user interface analyzer unit. Determining of semantic information of a plurality of business applications is explained with an example in FIG. 6.

Figure 6:
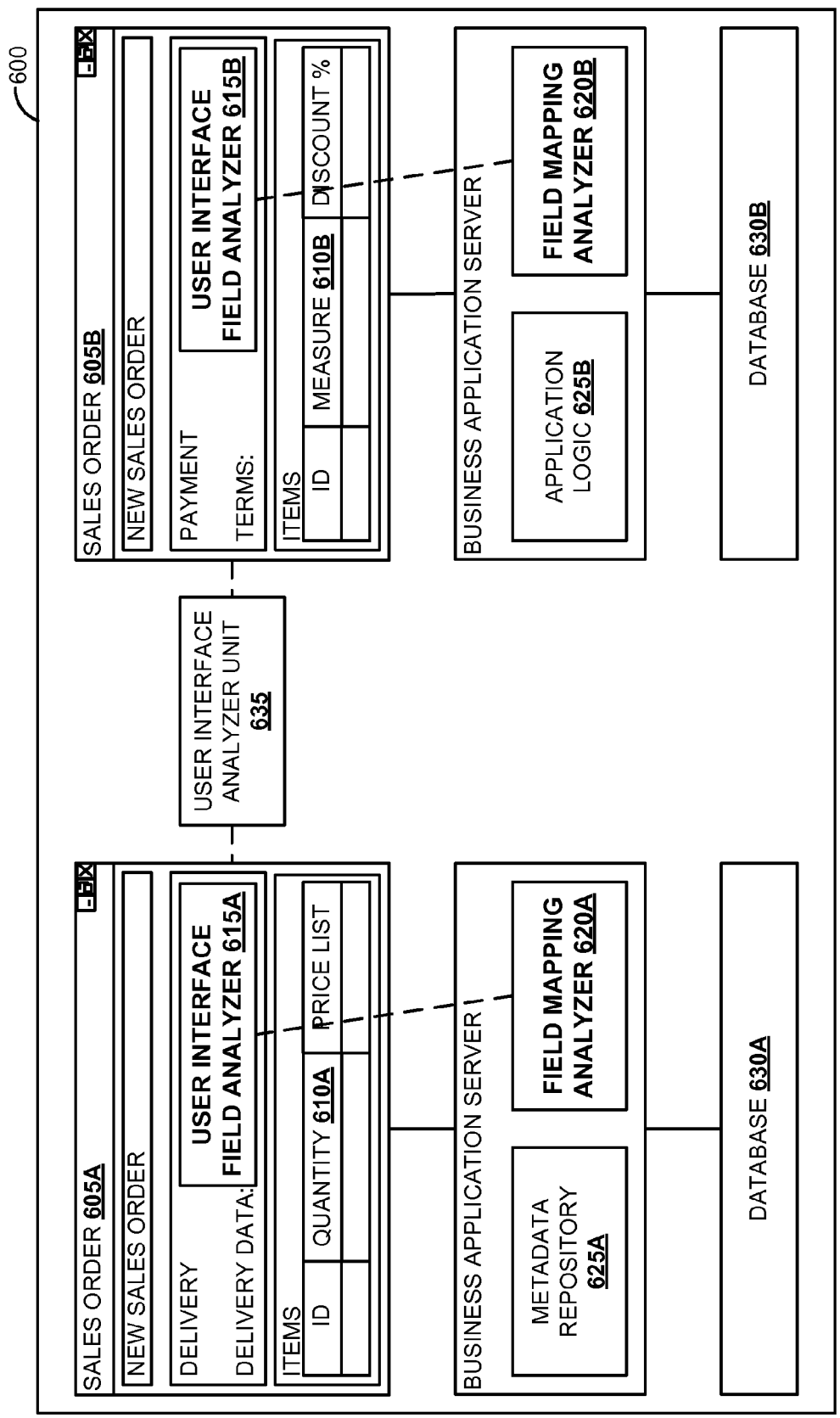
FIG. 6 is a block diagram illustrating an exemplary system to determine semantic information of two business applications of same or different vendors, according to an embodiment.

FIG. 6 is a block diagram illustrating an exemplary computer system 600 to determine semantic information of two business applications, according to an embodiment. The two business applications include and a sales order (e.g., 605A and 605B) business application. The business applications (e.g., 605A and 605B) are executed on the computer system 600. The business applications (e.g., 605A and 605B) can be from same or different vendors. In one exemplary embodiment, the semantic information of the business applications (605A and 605B) is determined using user interface field analyzers (e.g., 615A and 615B) and field mapping analyzers (e.g., 620A and 620B) specific to the business applications (e.g., 605A and 605B). The communication path used to determine the semantic information is shown in dotted lines.

For example, when a user selects a user interface element (e.g., 'quantity' 610A) of the sales order 605A, the user interface field analyzer 615A identify a user interface model name and accordingly triggers the field mapping analyzer 620A (wherein the field mapping analyzer 620A is specific to the sales order 605A). Further, the field mapping analyzer 620A identifies a data processing path of a business object stored in a metadata repository 625A and underlying database table fields stored in a database 630A. Generally, the business objects are represented in the metadata repository 625A as structured objects including a corresponding metadata object. Further, the business object includes the information of the object-relational mapping to the database 630A. Therefore, it is possible to find the data processing path of the user interface element 'quantity' 610A down to the business object filed described in the metadata repository 625A and further to database table field in the database 630A.

Further, a prompt is generated for the user to select a user interface element analogous to the user interface element 'quantity' 610A in sales order 605B. In response, the user may select a user interface element 'measure' 610B (as 'measure' 610B constitute same attribute 'quantity' 610A, i.e., the number of items). Furthermore, a data processing path associated with the user interface element 'measure' 610B is identified by the user interface field analyzer 615B and the field mapping analyzer 620B, using application logic 625B and a database 630B (as described for the user interface element 'quantity' 610A). For example, since the business application server of the sales order 605B is based on the application logic (e.g., using coding), the field mapping analyzer 620B detects source code to identify the data processing path associated with the user interface element 'measure' 610B.

In one exemplary embodiment, the data processing path associated with the user interface element 'quantity' 610A and the data processing path associated with the user interface element 'measure' 610B are grouped and stored in a user interface analyzer unit 635 as the semantic information of the business applications (e.g., 605A and 605B). In one exemplary embodiment, missing semantic information (i.e., if no corresponding or similar or analogous user interface elements are found between the business applications) can be enriched by tagging of the user interface elements with additional business knowledge.

Generally, the method described above includes business application specific software components in the user interface (e.g., user interface field analyzer) and in the application server (e.g., field mapping analyzer). Starting from the user interfaces of two different business applications on the same computer system, the is-equal (i.e., analyzing the user interfaces of the business applications to identify similar or analogous user interface elements) relationship of two corresponding user interface fields is analyzed. Further, corresponding business object fields and database table fields are identified by the field mapping analyzers. The field mapping analyzers dig in the bindings and usages of the user interface element until the data processing path to the corresponding business object field and database table field are found. Further, the field mapping information and the correlation of the different elements of the different business applications can be saved in different file formats for further processing in other tools like provisioning of the semantic documentation of legacy systems to simplify and improve data migration and business application integration.

Some embodiments of the invention may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments of the invention may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. Examples of computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hard-wired circuitry in place of, or in combination with machine readable software instructions.

Figure 7:
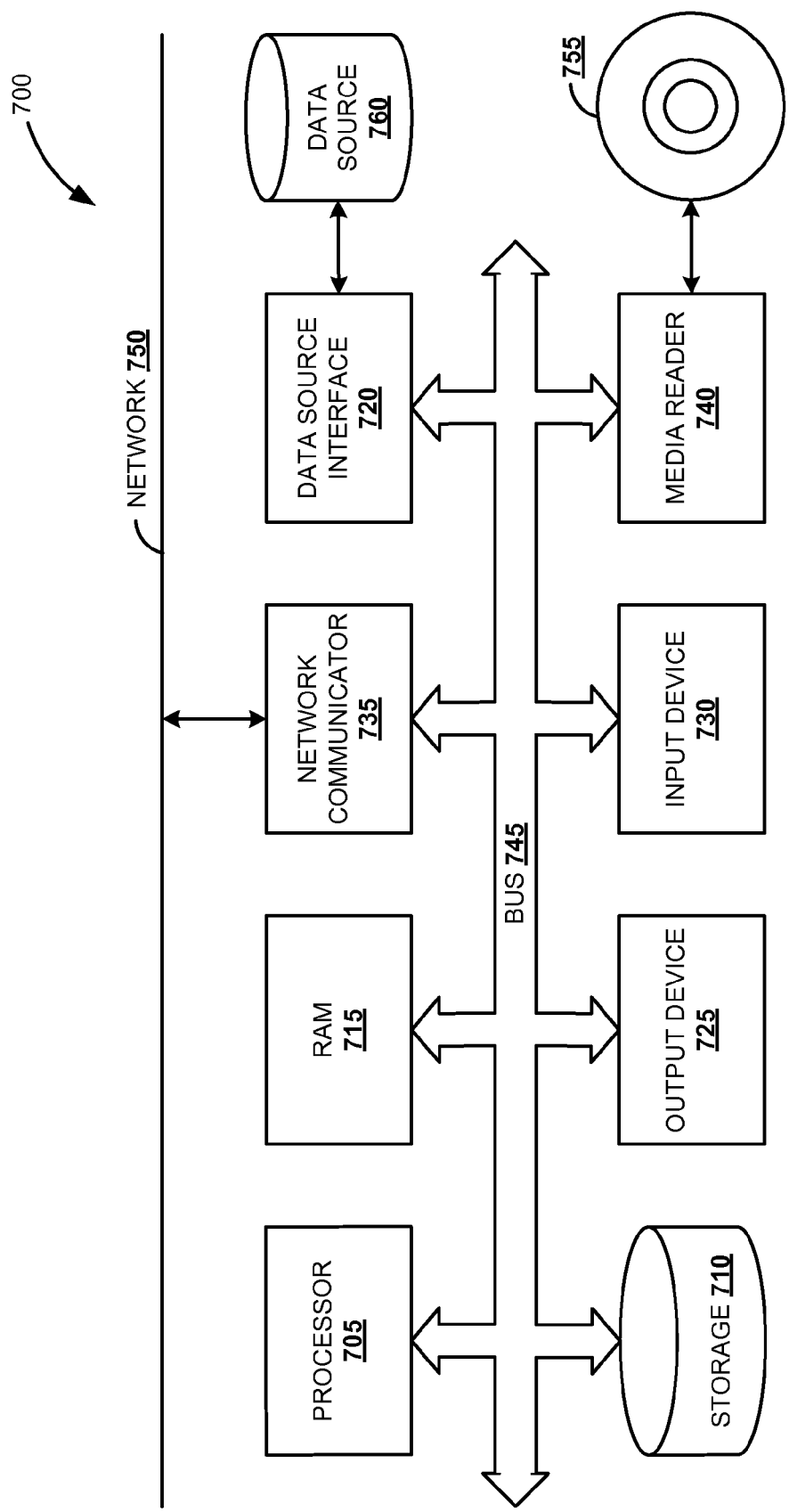
FIG. 7 is a block diagram illustrating a computing environment in which the techniques described to determine semantic information of business applications, according to an embodiment.

FIG. 7 is a block diagram of an exemplary computer system 700. The computer system 700 includes a processor 705 that executes software instructions or code stored on a computer readable storage medium 755 to perform the above-illustrated methods of the invention. The computer system 700 includes a media reader 740 to read the instructions from the computer readable storage medium 755 and store the instructions in storage 710 or in random access memory (RAM) 715. The storage 710 provides a large space for keeping static data where at least some instructions could be stored for later execution. The stored instructions may be further compiled to generate other representations of the instructions and dynamically stored in the RAM 715. The processor 705 reads instructions from the RAM 715 and performs actions as instructed. According to one embodiment of the invention, the computer system 700 further includes an output device 725 (e.g., a display) to provide at least some of the results of the execution as output including, but not limited to, visual information to users and an input device 730 to provide a user or another device with means for entering data and/or otherwise interact with the computer system 700. Each of these output devices 725 and input devices 730 could be joined by one or more additional peripherals to further expand the capabilities of the computer system 700. A network communicator 735 may be provided to connect the computer system 700 to a network 750 and in turn to other devices connected to the network 750 including other clients, servers, data stores, and interfaces, for instance. The modules of the computer system 700 are interconnected via a bus 745. Computer system 700 includes a data source interface 720 to access data source 760. The data source 760 can be accessed via one or more abstraction layers implemented in hardware or software. For example, the data source 760 may be accessed by network 750. In some embodiments the data source 760 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open DataBase Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments of the invention. One skilled in the relevant art will recognize, however that the invention can be practiced without one or more of the specific details or with other methods, components, techniques, etc. In other instances, well-known operations or structures are not shown or described in details to avoid obscuring aspects of the invention.

Although the processes illustrated and described herein include series of steps, it will be appreciated that the different embodiments of the present invention are not limited by the illustrated ordering of steps, as some steps may occur in different orders, some concurrently with other steps apart from that shown and described herein. In addition, not all illustrated steps may be required to implement a methodology in accordance with the present invention. Moreover, it will be appreciated that the processes may be implemented in association with the apparatus and systems illustrated and described herein as well as in association with other systems not illustrated.

The above descriptions and illustrations of embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize. These modifications can be made to the invention in light of the above detailed description. Rather, the scope of the invention is to be determined by the following claims, which are to be interpreted in accordance with established doctrines of claim construction.

What is claimed is:

1. An article of manufacture including a non-transitory computer readable storage medium to physically store instructions, which when executed by a computer, cause the computer to:
   receive a selection of a first user interface element from a first user interface of a first business application;
   generate a prompt to provide an option to a user to select a second user interface element from a second user interface of a second business application as analogous to the first user interface element from the first user interface, wherein the first user interface and the second user interface are two separate user interfaces on the computer and the first user interface is generated from the first business application and the second user interface is generated from the second business application and wherein the received selection of the first user interface element of the first business application comprises receiving a selection of a predetermined key combination for determining semantic information of the first business application and the second business application;
   when a selection of the second user interface element is received as analogous to the first user interface element through the generated prompt, perform the operations comprising:
      identifying data processing paths to a business object field and at least one corresponding database table field associated with the selected first user interface element and the second user interface element; and grouping the identified data processing paths associated with the first user interface element and the second user interface element to determine the semantic information of the first business application and the second business application; and when the selection is not received through the generated prompt, enable tagging the user interface elements of the first business application and the second business application with additional business information.

2. The article of manufacture of claim 1, wherein the data processing paths associated with the first user interface element of the first business application is identified by a user interface field analyzer and a field mapping analyzer specific to the first business application.

3. The article of manufacture of claim 2, wherein identifying the data processing path corresponding to the first user interface element of the first business application comprises:

receiving, at the user interface field analyzer, the selection of the first user interface element of the first business application;

identifying a user interface model name and context information associated with the selected first user interface element; and triggering the field mapping analyzer to identify the data processing path to the business object field and the corresponding at least one database table field using the identified user interface model name and the context information.

4. The article of manufacture of claim 1, wherein the data processing path corresponding to the second user interface element of the second business application is identified by a user interface field analyzer and a field mapping analyzer specific to the second business application.

5. The article of manufacture of claim 1, wherein the data processing path to the business object field and the corresponding at least one database table field defines binding information between the second user interface element, the business object field and the corresponding at least one database table field.

6. The article of manufacture of claim 1, wherein the determined semantic information of the first business application and the second business application is stored in a user interface analyzer unit in a file format.

7. A computer implemented method to determine semantic information of a plurality of business applications using a computer, the method comprising:

receiving a selection of a first user interface element from a first user interface of a first business application;

generating a prompt to provide an option to a user to select a second user interface element from a second user interface of a second business application as analogous to the first user interface element, wherein the first user interface and the second user interface are two separate user interfaces on the computer and the first user interface is generated from the first business application and the second user interface is generated from the second business application and wherein the received selection of the first user interface element of the first business application comprises receiving a selection of a predetermined key combination for determining semantic information of the first business application and the second business application;

when a selection of the second user interface element is received as analogous to the first user interface element through the generated prompt, perform the operations comprising:

identifying data processing paths to a business object field and at least one corresponding database table field associated with the selected first user interface element and the second user interface element; and grouping the identified data processing paths associated with the first user interface element and the second user interface element to determine the semantic information of the first business application and the second business application; and when the selection is not received through the generated prompt, enable tagging the user interface elements of the first business application and the second business application with additional business information.

8. The computer implemented method of claim 7, wherein the data processing path associated with the first user interface element of the first business application is identified by a user interface field analyzer and a field mapping analyzer specific to the first business application.

9. The computer implemented method of claim 8, wherein identifying the data processing path associated with the first user interface element of the first business application comprises:

receiving, at the user interface field analyzer, the selection of the first user interface element of the first business application;

identifying a user interface model name and context information associated with the selected first user interface element; and triggering the field mapping analyzer to identify the data processing path to the business object field and the corresponding at least one database table field using the identified user interface model name and the context information.

10. The computer implemented method of claim 7, wherein the data processing path corresponding to the second user interface element of the second business application is identified by a user interface field analyzer and a field mapping analyzer specific to the second business application.

11. The computer implemented method of claim 7, wherein the data processing path to the business object field and the corresponding at least one database table field defines binding information between the second user interface element, the business object field and the corresponding at least one database table field.

12. The computer implemented method of claim 7, wherein the determined semantic information of the first business application and the second business application is stored in a user interface analyzer unit in a file format.

13. A computer system to determine semantic information of a plurality of business applications, the computer system comprising:

at least one processor; and one or more memory devices communicative with the at least one processor, wherein the one or more memory devices store instructions to:

receive a selection of first user interface element from a first user interface of a first business application;

generate a prompt to provide an option to a user to select a second user interface element from a second user interface of a second business application as analogous to the first user interface element, wherein the first user interface and the second user interface are two separate user interfaces on the computer system and the first user interface is generated from the first business application and the second user interface is generated from the second business application and wherein the received selection of the first user interface element of the first business application comprises receiving a selection of a predetermined key combination for determining semantic information of the first business application and the second business application;

when a selection of the second user interface element is received as analogous to the first user interface element through the generated prompt, perform the operations comprising:
identifying data processing paths to a business object field and at least one corresponding database table field associated with the selected first user interface element and the second user interface element; and
grouping the identified data processing paths associated with the first user interface element and the second user interface element to determine the semantic information of the first business application and the second business application;
and
when the selection is not received through the generated prompt, enable tagging the user interface elements of the first business application and the second business application with additional business information.

14. The computer system of claim 13, wherein the data processing paths associated with the first user interface element of the first business application and the second user interface element of the second business application are identified by a user interface field analyzer and a field mapping analyzer specific to the first business application and the second business application.

15. The computer system of claim 13, wherein the data processing paths to the business object field and the corresponding at least one database table field defines binding information between the first user interface element and the second user interface element, and the corresponding business object field and the at least one database table fields.

16. The computer system of claim 13, wherein the determined semantic information of the first business application and the second business application is stored in a user interface analyzer unit in a file format.

17. The article of manufacture of claim 1, wherein the first business application and the second business application is executed by its corresponding application server and wherein an application server comprises one of a metadata repository based server and an application logic based server.

18. The computer implemented method of claim 7, wherein the first business application and the second business application is executed by its corresponding application server and wherein an application server comprises one of a metadata repository based server and an application logic based server.

19. The computer system of claim 13, wherein the first business application and the second business application is executed by its corresponding application server and wherein an application server comprises one of a metadata repository based server and an application logic based server.

* * * * *